United States Patent
Vitikainen

(10) Patent No.: US 6,351,522 B1
(45) Date of Patent: *Feb. 26, 2002

(54) METHOD FOR PROVIDING A DELIVERY CONFIRMATION OF MESSAGE DELIVERIES MADE IN A TELEPHONE NETWORK

(75) Inventor: Timo Vitikainen, Espoo (FI)

(73) Assignee: Nokia Telecommunications Oy, Espoo (FI)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/973,931
(22) PCT Filed: Jun. 7, 1996
(86) PCT No.: PCT/FI96/00341
  § 371 Date: Dec. 8, 1997
  § 102(e) Date: Dec. 8, 1997
(87) PCT Pub. No.: WO96/42163
  PCT Pub. Date: Dec. 27, 1996

(30) Foreign Application Priority Data

Jun. 8, 1995 (FI) .................................................. 952832

(51) Int. Cl.$^7$ ................................................. H04M 1/64
(52) U.S. Cl. .................... 379/67.1; 379/74; 379/88.12; 379/88.17; 379/88.22
(58) Field of Search ............................ 379/67.1, 88.01, 379/88.12, 88.17, 88.19, 88.22, 93.01, 93.21, 100.12, 157, 170, 185, 201, 211, 212, 210, 219, 220, 74, 85, 88.26; 455/412, 414, 418, 466; 341/20, 22, 23

(56) References Cited

U.S. PATENT DOCUMENTS 4,757,525 A * 7/1988 Matthews et al. ............. 379/89
4,972,461 A   11/1990 Brown et al. ................... 379/67

(List continued on next page.)

FOREIGN PATENT DOCUMENTS

| EP | 0 385 670 A3 | 9/1990 |
| EP | 588 101 | 3/1994 |
| WO | 85/05749 | 12/1985 |
| WO | 86/04474 | 7/1986 |
| WO | 87/07801 | 12/1987 |

OTHER PUBLICATIONS

Patent Abstract of Japan, vol. 8, No. 8, e–221, abstract of JP,A,58–175349, Oct. 14, 1983.
Discovery, Nokia Telecommunications Magazine, vol. 33, Fourth Quarter 1993.

Primary Examiner—Allan Hoosain
(74) Attorney, Agent, or Firm—Pillsbury Winthrop LLP

(57) ABSTRACT

The present invention relates to a method for providing delivery confirmation of message deliveries made in a telephone network. In a network of the present invention, subscriber-specific information is maintained to determine whether a subscriber has a message delivery service available that allows delivery of subscriber-specific messages. Upon delivery of confirmation of the availability of a subscriber message delivery service, a confirmation addressed to a subscriber is routed to the message delivery service on the basis of the subscriber-specific information. This and other aspects of the method of the present invention reduce extra network traffic that cannot be charged, and reduces the complications associated with other telephone network systems that require information to be provided by pushbutton dial to the system.

14 Claims, 3 Drawing Sheets

U.S. PATENT DOCUMENTS

| | | | |
|---|---|---|---|
| 5,027,384 A | * 6/1991 | Morganstein | 379/67 |
| 5,325,421 A | * 6/1994 | Hou et al. | 379/67 |
| 5,353,331 A | * 10/1994 | Emery et al. | 379/58 |
| 5,384,831 A | * 1/1995 | Creswell et al. | 379/67 |
| 5,497,412 A | * 3/1996 | Lannen et al. | 379/60 |
| 5,583,920 A | * 12/1996 | Wheeler, Jr. | 379/88 |
| 5,633,868 A | * 5/1997 | Baldwin et al. | 370/331 |
| 5,652,789 A | * 7/1997 | Miner et al. | 379/201 |
| 5,661,781 A | * 8/1997 | DeJager | 379/67 |
| 5,742,905 A | * 4/1998 | Pepe et al. | 455/461 |
| 5,752,188 A | * 5/1998 | Astrom et al. | 455/433 |
| 5,752,191 A | * 5/1998 | Fuller et al. | 455/445 |
| 5,797,094 A | * 8/1998 | Houde et al. | 455/412 |

* cited by examiner

METHOD FOR PROVIDING A DELIVERY CONFIRMATION OF MESSAGE DELIVERIES MADE IN A TELEPHONE NETWORK

This application is the national phase of international application PCT/FI96/00341, filed Jun. 7, 1996 which designated the U.S.

FIELD OF THE INVENTION

The invention relates to a method for providing delivery confirmations of message deliveries made in a telephone network, comprising the steps of:
a subscriber A providing a message addressed to a subscriber B, which message is temporarily stored in a storage device located in the network,
making an attempt for delivering the stored message to subscriber B, and
after said delivery attempts, delivering subscriber A a confirmation of the result of the message delivery. In principle, a message may be any type of message, such as a voice, data or telefax message. A voice message will be disclosed below, however, as a typical example of a message to be delivered.

BACKGROUND OF THE INVENTION

In telephone networks, centralized call answering services have been implemented in which a voice mail unit including several "mailboxes" has been connected to an exchange. When a subscriber of the telephone network uses a centralized call answering service, to a subscriber line is assigned one of the mailboxes of the voice mail unit. When there is an incoming call to the subscriber line, the home exchange of the subscriber will route the call to the voice mail unit, to the mailbox assigned to the subscriber. This rerouting may be programmed to take place either every time, only when the line is busy or when there is no answer from the subscriber line, or on some other corresponding condition. When a rerouted call is connected to the voice mail unit, the unit will play the announcement spoken by the subscriber of the service or the operator, and gives the calling party an opportunity to leave a voice message in the mailbox of the subscriber of the service. The subscriber may listen to the voice messages addressed to him by calling to a directory number that has been reserved for the mailbox of his own voice mail unit. A system of this kind is attended by the drawback that the subscriber will not know without making a call whether the exchange has rerouted any calls to the voice mail unit, or whether any messages have been dictated.

An improvement on the above is a "Message Waiting Indication" MWI service. Thus, when the exchange has routed a call addressed to the subscriber line to the voice mail unit, it will activate for the subscriber, upon the subscriber lifting the handset, e.g. a spoken message "voice messages are waiting" or a dialling tone that differs from the normal, instead of the normal dialling tone.

An even more advanced service is provided in such prior art systems in which an attempt is made for delivering (at a later instant) a voice message left by subscriber A to a desired subscriber B that was busy or did not reply during the call attempt made by subscriber A. A service of this kind is termed as a Message Delivery Service or Call Delivery Service. This kind of service is activated when the exchange providing the service receives an information on that subscriber B is busy or subscriber B has not replied during a specific time. Thereafter, instead of the "busy" tone, an announcement is switched to subscriber A from the announcement unit integrated to the exchange, the announcement telling that the subscriber can leave a message to subscriber B. In addition, the subscriber A may be provided with additional information on the billing tariff used. If subscriber A wishes to use the service, he dials a requested key (e.g. #). The call is thus routed to a service node, which instructs the subscriber in leaving a message. Upon leaving a message, subscriber A may give additional instructions on the delivery, that is, when the message should be delivered and/or how many attempts should be made. When the message has been left, the server attempts to deliver the message to subscriber B according to the instructions given by subscriber A. This kind of system is disclosed e.g. in European Patent Application 385,670.

Systems of this kind, however, are attended by the drawback that the user of the service (subscriber A) can only indirectly obtain a confirmation of the receipt of his message (e.g. after the receiving party has contacted him). In most cases, however, it would be necessary to receive a confirmation almost immediately after she delivery of the message, since spoken messages become outdated in a short time almost without exception.

An attempt has been made for relieving this problem e.g. in the system disclosed in U.S. Pat. No. 4,972,461. This publication discloses a system in which a confirmation of a completed message delivery or an unsuccessful delivery attempt may be provided to a calling party in association with the message delivery service of the speech/data messages, if the subscriber so desires. When using the system, the calling party may give the telephone number to which he wants the confirmation to be delivered. Simultaneously, he may also give, upon leaving a message, the date and the time and the duration, in which case the system will start the attempts for delivering the confirmation at the moment determined by the date and the time, making re-attempts, if need be, until said duration time expires.

The system of the kind disclosed above has the drawback that, first of all, a successful confirmation of the delivery is still not sure. The confirmation service makes a limited number of attempts (to provide the information on completed/unsuccessful delivery), i.e. the principle is the same as in delivery of the actual voice message). The service may thus have to make N attempts to deliver the message with no success, however, and thereafter another N attempts, for delivering the information on the unsuccessful attempt, again with no success. Thereafter, the information on a completed/unsuccessful delivery of the message is stored in the confirmation service for a predetermined time (e.g. 24 hours), during which the calling party may make inquiries about it).

The approach described above may also result in the confirmation service causing a lot of extra traffic in the network, which is such traffic that cannot be charged. The use of the system is also complicated, since a lot of information must be provided by the pushbutton dial to the system.

BRIEF DISCLOSURE OF THE INVENTION

The object of the present invention is thus to achieve such a novel method for providing delivery confirmations of message deliveries made in a telephone network enabling eliminating the above drawbacks.

The object of the invention is achieved with a solution of the invention, which is characterized by maintaining in the network subscriber-specific information on whether a subscriber has such a message delivery service available that allows delivery of subscriber-specific messages, whereby upon delivering a confirmation, it is possible to route a confirmation addressed to subscriber A to said message delivery service on the basis of said information, if need be.

The idea of the invention is to maintain in the network a subscriber-specific service profile or confirmation profile by means of which a confirmation transmitted from the message delivery service node to the subscriber may be transferred (if need be) to a message delivery service already at the subscriber's disposal. The message delivery service herein refers to any prior art service in which subscriber-specific messages can be left. Message delivery services of this kind include e.g. voice mail/call answering service or a short message service of a cellular network. The idea of the invention is thus to utilize other services available to the subscriber by delivering the confirmation data to such a service that already exists, at least in a case where the confirmation cannot be switched directly to the subscriber line.

In accordance with the invention, the user is provided with the delivery confirmation service only when it is sure that the confirmation is received at one attempt. The network utilizing the method is also able to provide the confirmation without the subscriber separately requesting it. Thus, in the subscriber-specific confirmation service, providing the delivery confirmation can be set as a default value, which may be changed (cancelled/disabled) by the subscriber message-specifically. Thus, it is simpler than heretofore for the subscriber to obtain a confirmation.

In accordance with a preferred embodiment of the invention, the delivery confirmations are routed via the home exchange of the subscriber, whereby it is possible to first make an attempt to deliver the confirmation directly to the subscriber's own terminal equipment.

BRIEF DESCRIPTION OF THE DRAWINGS

In the following, the invention and its preferred embodiments will be described in greater detail with reference to the examples in the attached drawings, in which.

DESCRIPTION OF THE PREFERRED EMBODIMENTS

Figures 1, 2:
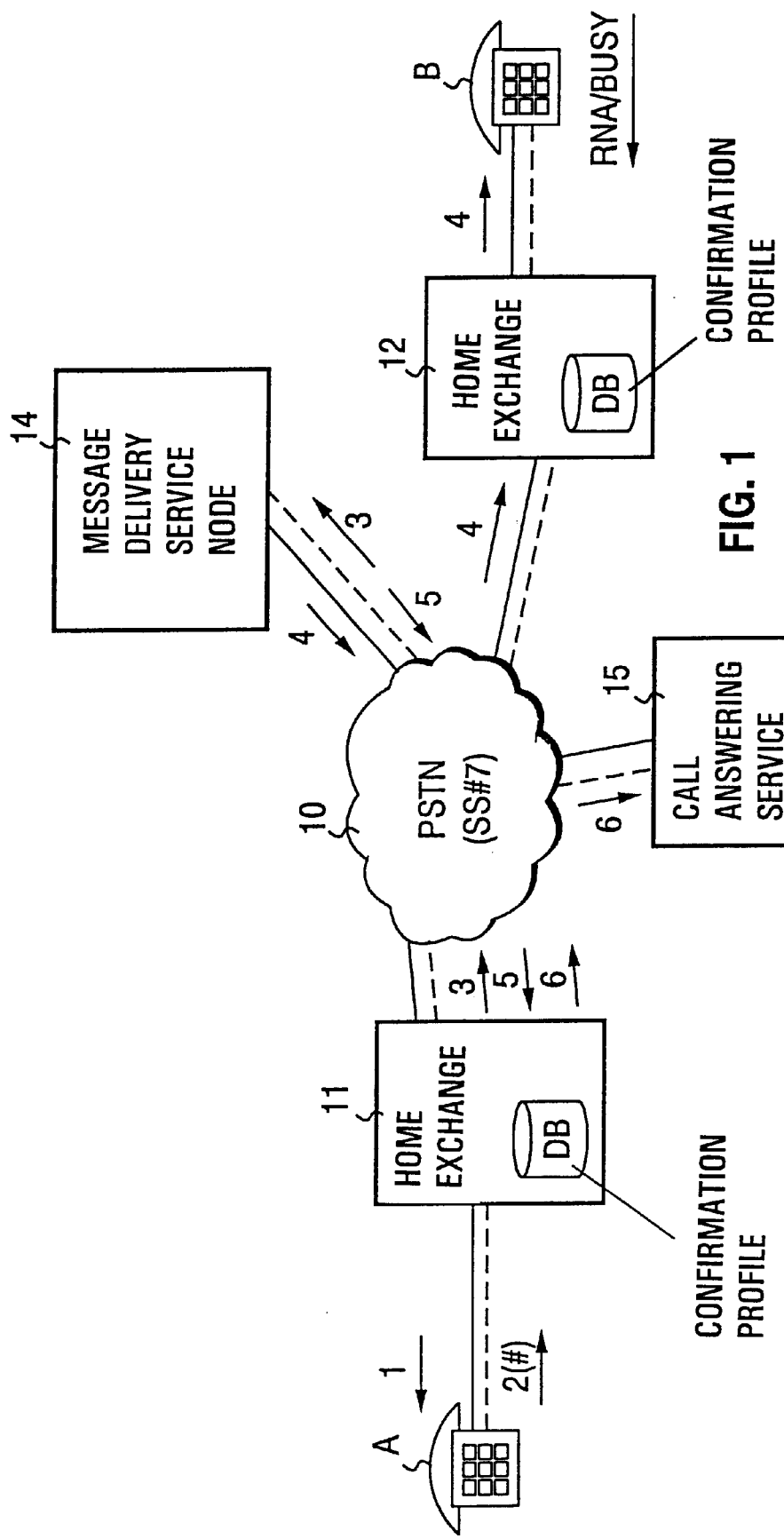
FIG. 1 shows a telephone network in which the method of the invention is used.
FIG. 2 shows a subscriber-specific confirmation profile record stored in the network.

FIG. 1 illustrates a public switched telephone network 10 in which the service implemented by means of the method of the invention is provided. In the exemplary network shown in the figure, there are two service nodes (known per se); a node 14 providing message (herein voice message) delivery service, and a node 15 providing call answering service. In addition, the figure shows the terminal equipments (typically telephone sets) A and B of two subscribers, and the home exchanges 11 and 12 related to subscribers A and B respectively. The terminal equipment of a subscriber (subscriber A) making use of the service of the invention is expected to be able to transmit dual tone multi frequency dialling (DTMF). Both the message delivery node and the call answering service node are connected to the network 10 by means of an SS7 interface known per se, that is, traffic control and management in the network is based on common channel signalling (CCS). In FIG. 1, signalling connections are marked with dotted lines and speech connections with solid lines.

Since both the voice message delivery service and the call answering service are known per se, they are not paid closer attention to herein. Voice message delivery service is disclosed in more detail e.g. in the patent publications referred to above. Since the more detailed structure of local exchanges is beyond the scope of the present invention, only the parts essential for understanding the present invention will be disclosed herein. Local exchanges may be e.g. DX 200 exchanges by the applicant, disclosed e.g. in "Discovery", vol. 33, Fourth Quarter 1993 (ISSN 0780-393).

In the following, the operation of the service according to the invention in a network shown in FIG. 1 will be described. Let us assume that a subscriber (subscriber A) having a terminal equipment A is calling to a subscriber (subscriber B) having a terminal equipment B and that subscriber B is busy or does not reply. Call set-up takes place in a way known per se so that the exchange 11 of subscriber A sends an initial message via a signalling network to the exchange 12 of subscriber B. This initial message may be either an IAM message (Initial Address Message) when an ISUP (ISDN user part) is used as the user part in the CCS system, or an IAI message (Initial Address message with additional Information) in a case where a telephone user part TUP is used as the user part.

When the exchange 11 of subscriber A receives the information that subscriber B is busy or when subscriber B has not replied during a specific time, an announcement is switched to subscriber A from an announcement unit integrated to the exchange 11, said announcement indicating that subscriber A can leave a message to be delivered to subscriber B. The announcement may be e.g. as follows: "The number you tried to reach is busy. You may dictate a message to be delivered to the number you tried to reach. For leaving a message, press the "#" key after the tone." Giving the announcement is marked with an arrow 1 in FIG. 1. (a prior art voice announcement device integrated to a telephone exchange is disclosed in more detail e.g. in Finnish Patent Application No. 943,598, filed Aug. 2, 1994 and published Feb. 2, 1996.)

When subscriber A wishes to use the service, he dials the requested character (e.g. "#"). This is illustrated with an arrow 2 in FIG. 1. Provided that subscriber A does no give the requested character within a specific time after the announcement, the call will be released.

When the exchange 11 has received the requested character #, it will reroute the call to the message delivery service node 14. In association with signalling, the exchange then sends to the node 14, in addition to an address number, (1) a cause code x, (2) the number of subscriber A, and (3) the original B-number (the number of subscriber B). The cause code x will indicate for which reason the call has been rerouted to the delivery service (e.g. x=1 corresponds to a situation in which subscriber B is busy, and x=2 corresponds to the situation in which subscriber B does not reply).

In accordance with the invention, subscriber-specific confirmation profiles are also maintained in the network, whereby in addition to the above mentioned information, information read from the confirmation profile of subscriber A is transmitted to the delivery service node 14 along with signalling. On the basis of said information, the delivery service node 14 makes a decision on transmitting the delivery confirmation and possibly on the confirmation method. In this exemplary case the confirmation profile is stored in the subscriber database of the home exchange 11 of the A subscriber, marked with DB in the figure.

The subscriber-specific confirmation profile may be e.g. similar to that shown in FIG. 2, that is, a record 20 stored in the subscriber database containing fields "confirmation method" and "routing method", or said fields can be a part of the subscriber-specific record 20 containing all the information on the subscriber. The field "confirmation method" contains information on whether a confirmation is made, and if that is the case, to which service already available to the subscriber the confirmation is made. The field "routing method", again, contains information on how the confirmation will be routed, i.e. if the confirmation is delivered e.g. (a) directly to some other service already available to the subscriber or (b) directly to some other service by means of a direct call forwarding unconditional carried out in the home exchange of the subscriber or (c) whether the confirmation is first attempted to made to the terminal equipment of the subscriber (in which case the call is forwarded only after the call cannot be switched to the number of the subscriber).

The confirmation method may in practice be coded e.g. in the following way:
1—no confirmation is made,
2—the confirmation is made in form of voice mail confirmation making use of the subscriber's voice mail box (call answering service),
3—a GSM short message confirmation to the subscriber's short message service.

In the following description, value 2 of the confirmation method will be used as an example, whereby confirmation is made to the voice mailbox of subscriber A, located in the call answering service node 15 shown in FIG. 1 (GSM short message confirmation will be set out below). The field "routing method" is not required in all cases, but it is advantageous in particular when the value of the confirmation method is 2.

Figure 3:
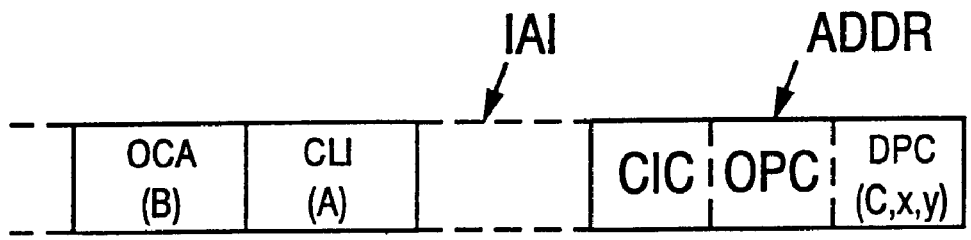
FIGS. 3–6 illustrate signalling messages that are transmitted at different stages of the method.

The identifier and the cause code of the service, as well as the subscriber-specific value (1, 2 or 3) of the confirmation method may be transmitted to the message delivery service node 14 e.g. at the end of the address number. Rerouting carried out by the exchange 11 may take place e.g. to a number Cxy, wherein C is the number of the delivery service node 14, x is the cause code and y is the value of the confirmation method. Signalling that starts storing the message is marked with an arrow 3 in FIG. 1, and FIG. 3 illustrates those fields of said initial address message IAI in which the above-mentioned information may be transmitted. The initial address message starts with a 40-bit address field ADDR containing a destination point code DPC, an originating point code OPC and a circuit identification code CIC. The destination point code DPC indicates the signalling point to which the message is addressed, and the above-mentioned information is thus transmitted as a part of this code if the information is transmitted as a part of the number related to node 14. In a CLI field (calling line identity) of the IAI message, the identity of the calling subscriber line is transmitted, herein A. An OCA field (original called address), in turn, is used for transmitting the original address, herein B. (those pieces of the above information that are transmitted in the field in question are shown in parenthesis below the corresponding field identifer).

When a call has been routed to the message delivery service node 14 in the manner described above, the node will instruct subscriber A on how to leave a message. When the message (voice message) has been left, it will be converted into a digital voice file, which is stored in the memory of a voice mail unit integrated or connected to the node.

In association with leaving the message, the service node may also ask whether the subscriber wishes the delivery to take place in accordance with the message delivery method set as the default (e.g. X attempts at intervals of Y minutes), or whether the subscriber wishes to give separate instructions on message delivery. Since these features are beyond the scope of the actual invention, they will not be paid closer attention to herein. Giving the instructions and delivering the message may be carried out in the same way as in the U.S. Pat. No. 4,972,461 mentioned above.

Figure 4:
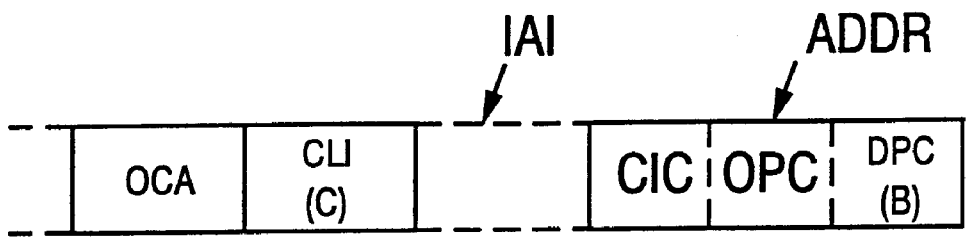

The message delivery service node then activates the attempts for delivering the message to subscriber B in accordance with the instructions it has received. The delivery takes place in a way known per se so that the message delivery service node 14 sets up a call to subscriber B. This is illustrated with an arrow 4 in FIG. 1. The message delivery service node then sends the address B in the destination point code of the IAI message, and its own address (C) in the CLI field. This message is illustrated in FIG. 4. If subscriber B is busy or does not reply to the call, the delivery service node will make a new attempt after a predetermined time (in accordance with the default delivery method, or the instructions given by the subscriber).

Figure 5:
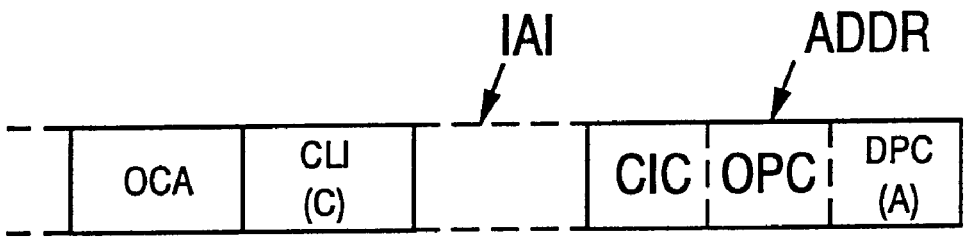

When the delivery of the message is completed, or when all the attempts have been made without succeeding in delivering the message, the service node will deliver a confirmation to the calling party (subscriber A), provided that the value of the confirmation method received at an earlier stage by the service node has indicated that a confirmation must be made (= the value was 2 or 3). As mentioned above, it is assumed in this example that the value of the confirmation method of subscriber A is 2, in which case the service node will call the number of subscriber A (calling party) and sets into the CLI field a predetermined identifier corresponding to the message delivery, which message may be e.g. the address of the service node (C). This is illustrated with arrows 5 in FIG. 1. The initial address message IAI is thus similar to that shown in FIG. 5, that is, the destination point code now contains the address of subscriber A.

When the exchange of subscriber A has received the signalling message transmitted by node 14, it will be able to "force" (reroute) the call to the call answering service of the subscriber. This "forcing" takes place on the basis of the identifier (C) identifying message delivery and on the basis of the called address (A) (in the signalling, the subscriber number may be delivered e.g. at the end of the address number or in the OCA field). This transmission may take place, depending on the global or the subscriber-specific setting, either immediately or in such a case that the call cannot be switched to the number of the subscriber (the preferred embodiment). If a subscriber-specific setting is used, the exchange will read the value stored in the field "routing method" of record 20, and acts accordingly. The call is forwarded to the call answering service regardless of the reason of the unsuccessful switching (the subscriber is busy or does not reply, call forwarding to another number etc.).

Figure 6:
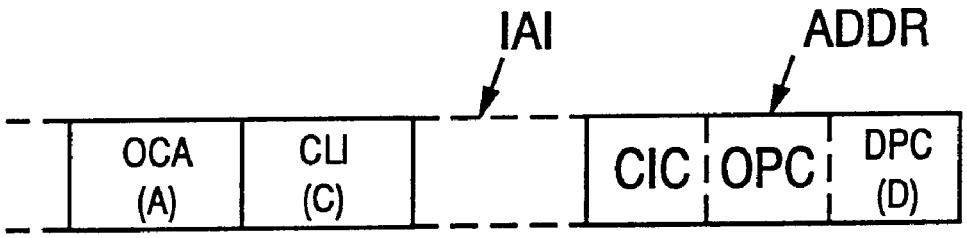

Forwarding the confirmation from the home exchange 11 of the subscriber to the call answering service node 15 is marked with arrows 6. The initial address message transmitted by the exchange 11 is thus similar to one shown in FIG. 6, that is, the CLI field contains the address of the message delivery service node (C), the OCA field contains the address of subscriber A, and the address (D) of the call answering service node 15 is coded in the destination point code DPC.

The message delivery service node is thus able to "dictate" the confirmation in every situation either directly to the subscriber or to his voice mailbox, in other words, the method of the invention enables delivery of the confirmation to the subscriber at one attempt.

In accordance with a preferred embodiment of the invention, the confirmation is delivered only when the message delivery has been successful.

The content of the confirmation may be e.g. the following: "Service X delivered your message "subject of the message" (that has been dictated by the calling party when leaving the message) to number 9050603766 on March 30th, at 13.30". When the confirmation has been delivered, it is communicated to the subscriber with the prior art methods that are supported by said call answering service and the network. If the call answering service used supports e.g. the MWI (Message Waiting Indication) service mentioned above, the subscriber will receive an indication as usual (e.g. instead of the ringing tone) of the message that has been left, which may thus be a delivery confirmation of a message left by the subscriber himself.

Confirmation delivery in the subscriber's mailbox may be e.g. so optimized that the call answering service "tapes" the confirmation dictated by the message delivery service to the voice mailbox of the subscriber directly without greeting prompts. The information contained in the CLI field is thus transferred in the signalling from the message delivery service platform to the call answering service platform (provided that there is such a SS7 network in use in which a CLI field is transferred).

In the above, the preferred embodiment of the invention was disclosed, in which embodiment the confirmation was routed via the subscriber's own exchange so that it would be possible to first make an attempt to switch the confirmation to the number of the subscriber. This embodiment may be modified, firstly, e.g. by transferring the information on the subscriber's routing method to the message delivery service node, whereby said node will be able to route part of the confirmations directly to the call answering service. (call answering services may be distributed, in which case the message delivery service node must be transmitted the address of the voice mailbox of the subscriber in question). A third possible embodiment is such that no subscriber-specific information on the routing method is used in the network, but the confirmations for all the subscribers that are provided with a confirmation are routed from the message delivery service node directly to the call answering service node. This is advantageous especially when the nodes are able to maintain the information on each other's addresses. (in accordance with the above, the message delivery service and the call answering service may be separate service nodes of the network, which do not necessarily maintain information on each other's addresses).

Figure 7:
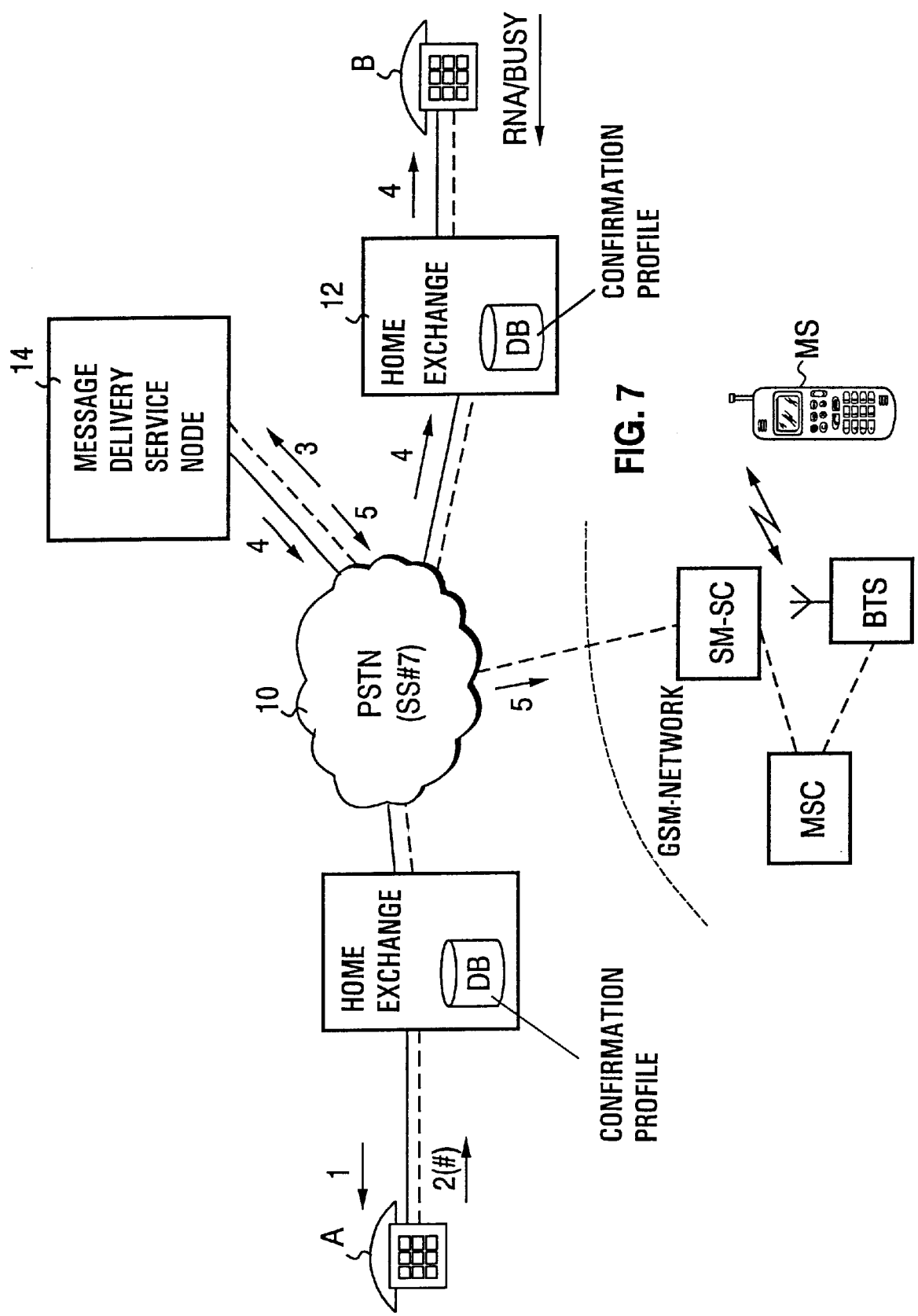
FIG. 7 illustrates such an embodiment of the invention in which the short message service provided by the cellular network is utilized.

As mentioned above, instead of the call answering service, it is possible to make use of GSM short message service (or a corresponding service provided by some other mobile communications system), for instance, for delivering confirmations. In this case it is advantageous that the message delivery service node generates the confirmation to be provided in form of a short message directly to the short message service centre SM-SC of the GSM network. This is illustrated with arrow 5 in FIG. 7, in which the parts corresponding to each other are denoted with the same reference symbols as in FIG. 1. Generating a short message is carried out in the same way as in a case where a user of a standard PSTN network leaves a message to a user of the GSM network, that is, either by giving predetermined codes (each of which is represented by a specific text) or by supplying free-format text (in signalling). The short message service centre forwards the short message to the Mobile Switching Centre MSC, which routes it via the appropriate base station BTS to the mobile station MS. Since the short message service centre SM-SC of the GSM network is known per se, it will not be paid closer attention to herein. A more detailed description is found e.g. in Mouly, Pautet: "The GSM System for Mobile Communications", 1992 (ISBN 2-9507190-0-7). It must be noted that the short message service provided by the GSM system is different from the call answering service in that respect that it does not provide the confirmation message in form of speech, but by means of signalling.

In the above example, subscriber-specific confirmation profiles were stored in the subscriber's home Mobile Switching Centre. Confirmation profiles may be maintained and obtained by means of a solution based on intelligent networks, however, in which case the storage of the confirmation profiles of the subscribers is centralized e.g. in a service control point SCP or in a service switching and control point SSCP. Centralized storage of this kind facilitates the data management compared with the "decentralized solution" disclosed above. In a solution based on intelligent networks, a call control function CCF located in the home Mobile Switching Centre of the subscriber has no service information, but it has been programmed to identify service requests. The CCF interrupts call establishment for a while and communicates the SSF of the status of the call. The task of the SSF is to interpret the service request and the call status information, to generate a standardized service request and to send the request to the SCF. The SCF receives the request and decodes it. Thereafter it generates, encodes and transmits a standardized reply to the SSF. In this case the reply contains subscriber-specific confirmation profile information.

The solutions disclosed above are related either to a public switched telephone network PSTN only, or to the combination of the PSTN network and a cellular network. In principle, the method may also be implemented within a single cellular network. It must thus be understood that the term "telephone network" refers to different networks and their combinations.

Although the invention has been disclosed above with reference to the examples in accordance with the attached drawings, it is obvious that the invention is not limited thereto, but it may be modified within the scope of the inventive idea set forth in the attached claims. A more detailed implementation may thus be varied within the scope of prior art technique and the knowledge of a person skilled in the art.

What is claimed is:

1. A method for providing delivery confirmations of message deliveries made in a telephone network, comprising:

maintaining in a node in the telephone network subscriber-specific information on that a subscriber A has a message delivery service available that allows delivery of subscriber-specific messages, initiating a call setup from subscriber A to a subscriber B, if the call setup to subscriber B fails, automatically rerouting the call to a message delivery node, which is remote from said node maintaining the subscriber-specific information, signaling said subscriber-specific information of the subscriber A to the message delivery node along with said rerouting by the telephone network, providing from subscriber A a message addressed to the subscriber B, and temporarily storing the message at said message delivery node, making at least one attempt to deliver the stored message to the subscriber B, and after said delivery attempt, delivering a confirmation of the result of the message delivery from the message delivery node to subscriber A by routing said confirmation to said message delivery service of subscriber A on the basis of said subscriber-specific information of subscriber A signaled to the message delivery node.

2. The method according to claim 1, wherein the step of maintaining said subscriber-specific information is performed by maintaining said subscriber-specific information in a subscriber database in the telephone network.

3. The method as claimed in claim 2, wherein said step of routing said confirmation is performed by routing said confirmation to a short message service center of a mobile co m communication network directly from said message delivery node.

4. The method as claimed in claim 1, wherein said step of routing said confirmation is performed by routing said confirmation to a short message service center of a mobile communication network directly from said message delivery node.

5. The method as claimed in claim 1, wherein said step of delivering a confirmation is performed by always delivering the confirmation to a call answering service when subscriber A has a call answering service available.

6. The method as claimed in claim 1, wherein said step of delivering a confirmation is performed only when the message delivery to subscriber B is successful.

7. A method for providing delivery confirmations of message deliveries made in a telephone network, comprising:

initiating a call setup from a subscriber A to a subscriber B, if the call setup to the subscriber B fails, automatically rerouting the call to a message delivery node by the telephone network, providing from subscriber A a message addressed to subscriber B, and temporarily storing the message at said message delivery node, making at least one attempt for delivering the stored message to subscriber B, and after said at least one delivery attempt, delivering a confirmation of the result of the message delivery from the delivery node to subscriber A by routing said confirmation to a home telephone exchange of subscriber A, wherein said delivering a confirmation of the result of the message delivery to subscriber A comprises:

maintaining in association with the home telephone exchange of subscriber A or in a subscriber database a subscriber-specific information on that subscriber A has a message delivery service available that allows delivery of subscriber-specific messages, said message delivery service being remote from said message delivery node, making an attempt to deliver the confirmation from said home telephone exchange directly to subscriber A, and when the attempt to deliver the confirmation directly to the subscriber A fails, forwarding the confirmation from said home telephone exchange to the message delivery service of subscriber A indicated by the subscriber-specific information stored in the home telephone exchange or in the subscriber database.

8. The method as claimed in claim 7, wherein said step of delivering a confirmation is performed only when the message delivery to subscriber B is successful.

9. A method for providing delivery confirmations of message deliveries made in a telephone network, comprising:

initiating a call setup from a subscriber A to a subscriber B, if the call setup to the subscriber B fails, automatically rerouting the call to a message delivery node by the telephone network, providing from subscriber A a message addressed to subscriber B, and temporarily storing the message at said message delivery node, making at least one attempt for delivering the stored message to subscriber B, and after said at least one delivery attempt, delivering a confirmation of the result of the message delivery from the delivery node to subscriber A by routing said confirmation to a home telephone exchange of subscriber A, wherein said step of delivering a confirmation of the result of the message delivery to subscriber A comprises:

maintaining in association with the home telephone exchange of subscriber A or in a subscriber database a subscriber-specific information on that the subscriber A has a message delivery service and (a) that said routing is to be carried out directly from the subscriber's home exchange to said message delivery service unconditionally, or (b) that said routing is to be carried out only in the case that the confirmation cannot be switched to terminal equipment of subscriber A in the home exchange of subscriber A, said message delivery service of subscriber A being remote from said message delivery node, wherein the home exchange of the subscriber A carries out the delivery of the confirmation according to said subscriber-specific information.

10. The method according to claim 9, wherein said step of delivering a confirmation to subscriber A comprises the steps of initially attempting to deliver the confirmation directly to subscriber A, and if the attempt to deliver the confirmation directly to subscriber A fails, forwarding the confirmation to the message delivery service of the subscriber A on the basis of said subscriber-specific information.

11. The method as claimed in claim 9, wherein said step of delivering a confirmation is performed by always delivering the confirmation to a call answering service when the subscriber A has a call answering service available.

12. The method as claimed in claim 9, wherein said step of delivering a confirmation is performed only when the message delivery to subscriber B is successful.

13. A method for providing delivery confirmations of message deliveries made in a telephone network, comprising:

initiating a call setup from a subscriber A to a subscriber B,—if the call setup to the subscriber B fails, automatically rerouting the call to a message delivery node by the telephone network, providing from subscriber A a message addressed to subscriber B, and temporarily storing the message at said message delivery node, making at least one attempt to deliver the stored message to subscriber B, and after said at least one delivery attempt, delivering a confirmation of the result of the message delivery from the delivery node to subscriber A by routing said confirmation to a home telephone exchange of subscriber A, wherein said delivering a confirmation of the result of the message delivery to subscriber A comprises:

maintaining in a subscriber database of the telephone network a subscriber-specific information on that subscriber A has a message delivery service available that allows delivery of subscriber-specific messages, said subscriber database being remote from said message deliver node, attempting to deliver the confirmation from said home telephone exchange directly to subscriber A, and when the attempt to deliver the confirmation directly to subscriber A fails, forwarding the confirmation from said home telephone exchange to said message delivery service of subscriber A on the basis of said subscriber-specific information, obtained from said subscriber database.

14. The method as claimed in claim 13, wherein said step of delivering a confirmation is performed only when the message delivery to subscriber B is successful.

* * * * *